Dec. 4, 1956  L. J. BRIDINGER  2,772,799
BOAT LOADER
Filed Jan. 16, 1953  2 Sheets-Sheet 1
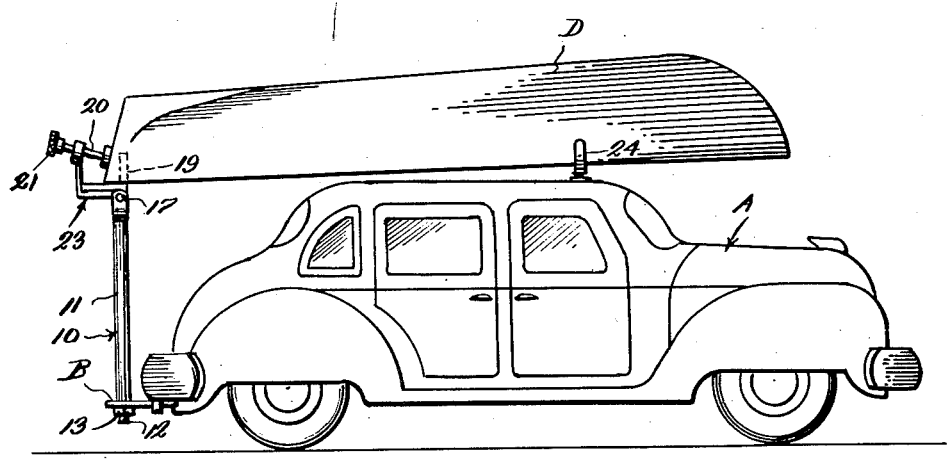
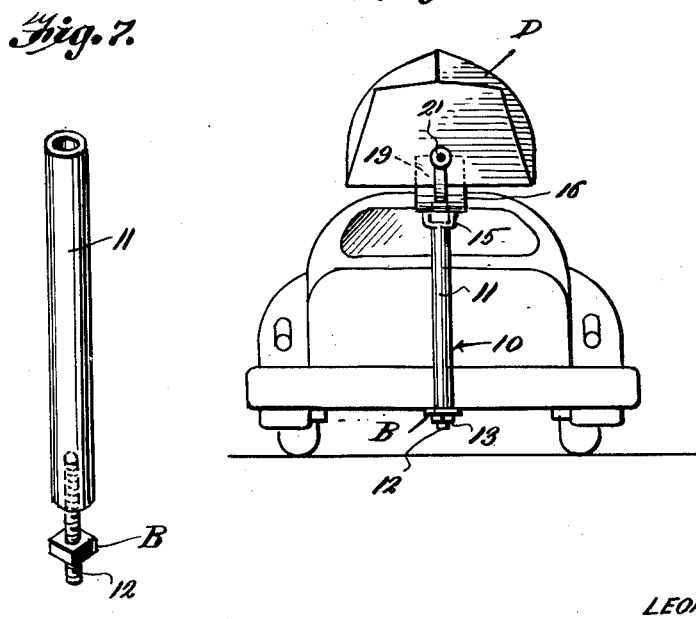
INVENTOR.
LEON J. BRIDINGER
BY
Patrick D. Beavers
ATTORNEY Dec. 4, 1956 L. J. BRIDINGER 2,772,799
BOAT LOADER Filed Jan. 16, 1953 2 Sheets-Sheet 2

INVENTOR.
LEON J. BRIDINGER
BY
*Patrick D. Beavers*
ATTORNEY

United States Patent Office 2,772,799
Patented Dec. 4, 1956

2,772,799

BOAT LOADER

Leon J. Bridinger, Lansing, Mich.

Application January 16, 1953, Serial No. 331,617

1 Claim. (Cl. 214—450)

This invention relates to improvements in means for loading and carrying boats on automobiles.

At present, it is almost impossible for one man to load a vehicle with a boat of the outboard motor type. Usually two men are required and even then the job of loading is tedious and fatiguing.

The principal object of the present invention is to provide means for adequately supporting one end of the boat while the boat is swung around by one man, over the top of the vehicle where it can be brought to rest in a cradle, thus dispensing with the services of a second man.

Another object of the invention is to provide boat loading means for vehicles which can employ a common trailer hitch as part of the supporting means for one end of the boat preparatory to swinging the boat over the top of the automobile to rest in a suitable cradle located upon the automobile.

Still another object of the invention is to provide a one man boat loading mechanism, which is both simple and positive acting and a structure which can be manufactured and retailed at a low monetary figure.

A further object of the invention is to provide a one man boat loader which is positive acting in use and not susceptible to the ready development of defects.

These and other objects and advantages of the invention will become apparent to the reader of the following description.

In the drawings:

Figure 1 is a side elevational view showing the loading device in loaded position upon an automobile.

Figure 2 is a rear end elevational view showing the boat in loaded position.

Figure 7 is a perspective view of the supporting tube.

Figure 4:
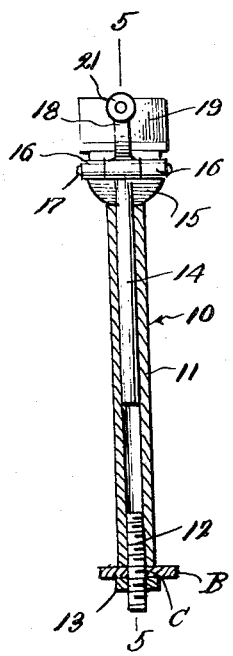
Figure 4 is a vertical sectional view through the upright structure of the loader.
Figure 5:
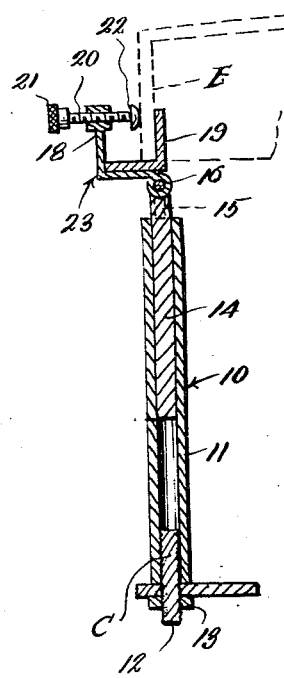
Figure 5 is a section taken substantially on line 5—5 of Figure 4.
Figure 6:
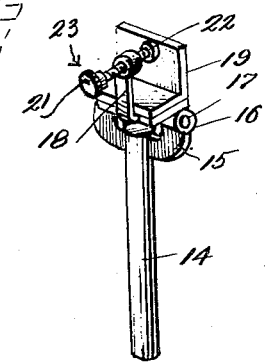
Figure 6 is a perspective view of the clamp means.

Referring to the drawings, wherein like numerals designate like parts, it can be seen, that reference character A denotes a conventional automobile and this vehicle is provided with what may be regarded as a conventional trailer hitch B having an opening therein as denoted by reference character C. (See Figures 4 and 5.) Reference character D denotes a conventional outboard motor type boat having the usual stern wall E. The present invention is generally referred to by numeral 10 and includes a vertical tube 11 having internal threads at its lower end for receiving a portion of a threaded pin 12, this pin extending downwardly through the opening C in the hitch B, the same being equipped with a nut 13 below the hitch B, this nut being tightened against the bottom of the hitch B to hold the tube 11 in firm vertical position.

Rotatively disposed within the upper portion of the tube 11 is a shaft 14 having a yoke 15 at its upper end, the arms of the yoke 15 being provided with barrels 16, 16 through which a hinge pin 17 is disposed.

Figure 3:
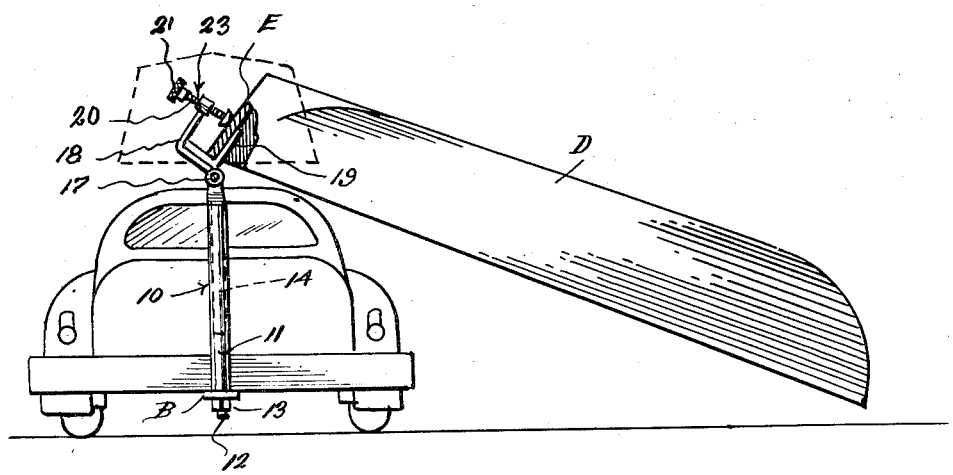
Figure 3 is a side elevational view of the boat, but looking at the rear of the vehicle, showing the rear portion of the boat engaged by the clamp of the loader, the boat being in a position about to be swung over the vehicle and to the position shown in Figure 1.

From a medial point of the pin 17 and an L-shaped clamp section 18 rises and an L-shaped bracket 19 is welded otherwise secure to the horizontal portion of the clamp section 18. This provides a U-shaped clamp and through the upper portion of the section 18 a screw 20 is feedable, the screw 20 having a knob 21 at its outer end and a head 22 at its inner end. Obviously the stern wall E of the boat D is to be clamped between the bracket 19 and the head 22 of the clamp screw 20, as is apparent in Figures 3 and 5. Thus it can be seen that the clamp structure which will here be referred to generally by numeral 23 allows for vertical plane movement of the boat D and while the shaft 14 disposed in the tube 11 allows for horizontal plane movement of the boat 10 when the boat is properly clamped in position as shown in Figure 3.

In the use and operation of this boat loader, it can be seen that one man simply lifts the rear or stern end of the boat upwardly and sets the stern wall E within the clamp 23. He then tightens the screw 20 against the stern wall so that the stern wall is clamped between the head of the clamp screw and the bracket 19. The boat is now attached to the loader and the man can then go to the bow of the boat, lift the same and move forwardly of the vehicle, lifting the boat over the top of the vehicle and permitting it to come to rest in a suitable cradle 24 located upon the forward portion of the vehicle top.

When he reaches his destination, he simply has to lift the boat from the cradle 24, rotate the boat to a lateral position with respect to the rear of the vehicle, unloosen the clamp and lift the stern end of the boat from the clamp.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A boat loading device for use with a vehicle comprising a vertical upright rigidly secured to a bumper of said vehicle, a clamp provided with swiveling connection means between the clamp and the upright permitting rotation of the clamp about a vertical axis, said clamp having means adapted to engage the stern wall of a boat preparatory to swinging the boat to rest its position upon the roof of a vehicle, said swiveling connection means including a shaft depending from the clamp structure, said upright being in the form of a tube for receiving the shaft, said shaft being rotatable about a vertical axis of the tube, and hinge means connecting the clamp and the shaft permitting pivotal movement of the clamp about a horizontal axis.

References Cited in the file of this patent

UNITED STATES PATENTS

| | | |
|---|---|---|
| 1,681,936 | Hillstrom | Aug. 28, 1928 |
| 1,688,765 | Veras | Oct. 23, 1928 |
| 2,220,220 | Cusimano | Nov. 5, 1940 |
| 2,492,841 | Burkey | Dec. 27, 1949 |
| 2,561,199 | Harder | July 17, 1951 |
| 2,631,806 | Harder et al. | Mar. 17, 1953 |